INVENTOR.
Alexander M. Senkewich
BY James M. Heilman

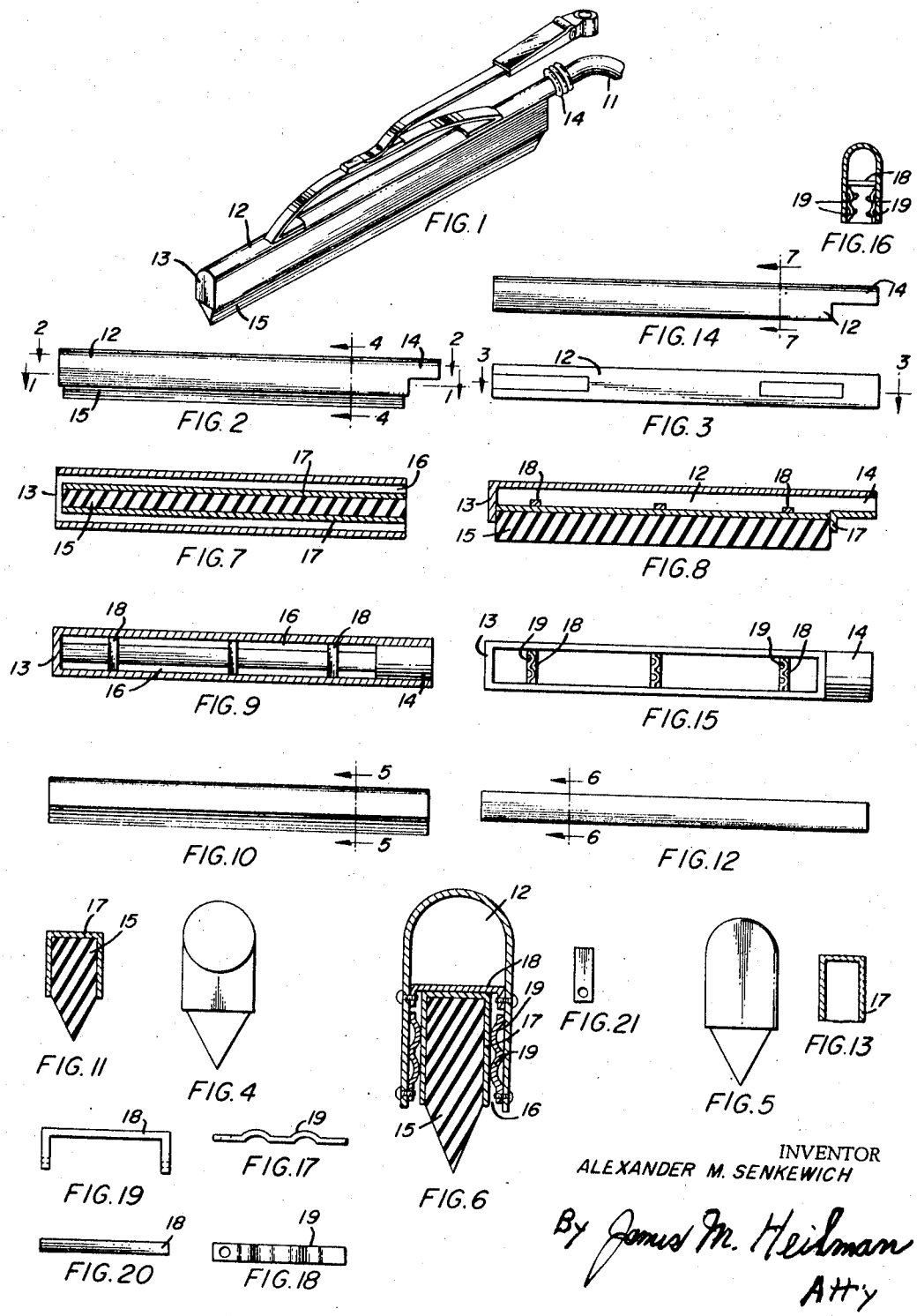

United States Patent Office 3,447,186
Patented June 3, 1969

3,447,186
WINDSHIELD WIPER, DEFROSTER AND WASHER
Alexander M. Senkewich, New York, N.Y., assignor of five percent each to Marjorie Kingston, Flushing, N.Y., and Linda Heilman, Rye, N.Y.
Continuation-in-part of application Ser. No. 426,029, Jan. 18, 1965. This application May 10, 1967, Ser. No. 637,601
Int. Cl. B60s 1/46, 1/54; A47l 1/16
U.S. Cl. 15—250.04                      3 Claims

ABSTRACT OF THE DISCLOSURE

A windshield wiper that is supplied selectively with hot air, or cold or heated liquid, or a mixture of both mediums to one or more front and rear window wipers.

---

This application is a continuation-in-part application of application Ser. No. 426,029, filed Jan. 18, 1965, Patent No. 3,321,792, granted May 30, 1967, entitled "Windshield Wiper With Hot Air," which patent is included herein by reference in all its disclosure.

With the coming of cold weather and frosts, the front windshield and other windows of the car present the driver with the two following major inconveniences:

(1) Fogging of the windshield and other windows from the inside. The visibility in this case is significantly reduced and the driver is forced almost constantly to wipe the windshield. This he does while the car is moving, controlling the steering wheel with only one hand, and, what is more important, his attention is distracted for a few moments from the road while he is busy cleaning the windshield. This circumstance may lead to an accident.

(2) The second inconvenience for the driver is the windshield during freezing weather when the outside of the windshield is covered with frost or a thin layer of ice. This also reduces the visibility.

To eliminate these two inconveniences, I propose to make a windshield wiper in the form of an almost closed elongated box or collector into which hot air or a liquid medium enters. This medium has only one outlet from the air collector; two minute openings situated below on both sides of the rubber wiper, intended for windshield cleaning. Thus during the operation of the windshield wiper, one can turn on the hot air or cold water, alcohol, or other conventional solutions used in cold weather for their non-freezing properties, i.e., lower freezing temperatures. Obviously, heated water may be used if desired by forming the liquid tank with a conventional heating coil. The medium enters the air collector and the windshield will be hit directly by a pressure jet through the minute openings at the bottom of the rubber wiper. The above-mentioned minute openings extend along the entire length of the air collector.

The hot air will defrost the windshield from the outside and will eliminate the fogging from the inside since the entire windshield wiper warms up quickly.

Referring to the figures, it will be seen that:

FIG. 1 is a perspective view of the automobile windshield wiper. Here is shown the elongated box—the collector with the rubber wiper, the existing clamping mechanism and a portion of the pipe supplying the hot air to the collector.

FIG. 2 is a front view of the collector with the wiper only.

Figure 22:
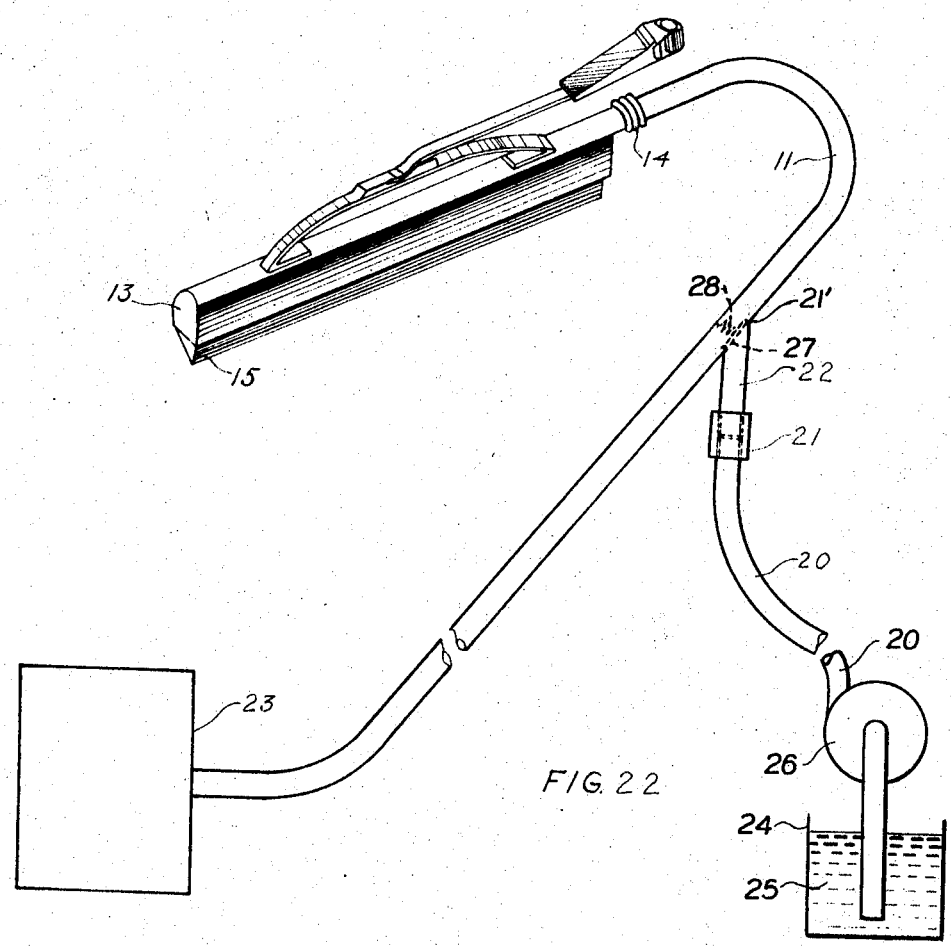

FIG. 3 is a plan view of the same.
FIG. 4 is a right side view of the same.
FIG. 5 is a left side view of the same.

FIG. 6 is an enlarged cross-section on the line 4—4 of FIG. 2.
FIG. 7 is a top view of the section on the line 1—1 of FIG. 2.
FIG. 8 is a front elevation view section on the line 3—3 of FIG. 3.
FIG. 9 is a top view of the section on the line 2—2 of FIG. 2.
FIG. 10 is a front view of the wiper.
FIG. 11 is a cross-section on the line 5—5 of FIG. 10.
FIG. 12 is a front view of the wiper housing 17.
FIG. 13 is a cross-section of wiper housing 17 on line 6—6 of FIG. 12.
FIG. 14 is a front view of the box collector 12.
FIG. 15 is a bottom view of the same.
FIG. 16 is a cross-section of the same on the line 7—7 of FIG. 14.
FIG. 17 is a front view of the spring clamp.
FIG. 18 is a plan view of the same.
FIG. 19 is a front view of the strip or plank serving as an upper support for the wiper.
FIG. 20 is a plan view of the same.
FIG. 21 is a side view of the same.
FIG. 22 is a modified arrangement which selectively supplies hot air or a liquid medium to any glass area of an automobile.

The air, water or combined air-water collector consists of an elongated box closed from the top, from both sides, and from one end. The bottom and the upper portions of the front end remain open (see FIGS. 2–5, and 14–16). The top portion of the front end has a circular section onto which a light flexible pipe 11 is fitted carrying a medium into the collector. As shown in FIG. 1, the bottom of this air or liquid collector is open, and into it is fitted a rubber or other type wiper 15 (see FIG. 6) which melts ice and cleans the windshield. In order for the wiper to be held on a fixed level, three strips or stops 18 (see FIGS. 19 and 20) are fastened inside the collector. Thus, when the wiper is inserted into the collector, it will not go past the stops 18 (FIG. 6).

In order that the rubber wiper be firmly held in the air or water collector, three spring clamps 19 are fastened to each of the two side walls (FIGS. 17 and 18). These clamps are fastened under the stops 18. Before the wiper is inserted into the collector, a housing made, for example, from a thin plastic or metal plate is tightly fitted over the right angle portion of it. Thus, the windshield wiper inserted into the collector will come up to the stops 18 from one side, and will be firmly held on the sides by the spring clamps 19 from the other side.

Along the entire length of the air collector, between the housing of the rubber wiper and the side wall of the collector, on both sides of it there remains minute opening 16 (see FIGS. 7 and 9) whose width corresponds to the thickness of the spring clamps 19. The hot air from the air collector passes through these minute openings directly onto the windshield.

The working of the windshield wiper proposed by me consists of the following:

The hot air (or other medium) is fed into the air collector 12 through the light flexible pipe 11 (see FIG. 1). From the collector 12 the hot air, under pressure, passes through the openings 16 directly onto the windshield.

As is evident from the above, along the entire length of the air collector there are two minute openings and a rubber wiper between them. Thus, during the operation, there will always be a jet of hot air striking the windshield from the front of the rubber wiper and from behind it, irrespective of the direction of movement of the windshield wiper.

The hot air enters the air collector from a heater chamber 23, or a covered exhaust manifold (not shown)

common to all automobiles in which the air is heated for the warming of the interior of the automobile. Thus, by the action of a switch, the hot air is directed either for the warming of the automobile or into the air collector for the warming of the front of the windshield and/or other windows. This air enters the air collector under pressure which corresponds to the power of the chamber fan. The inside defroster presently applied to autos does not fully serve its purpose since the air is dispersed always in one fixed direction which is limited in extent. With the application of my windshield wiper, however, the hot air strikes directly the total area of the windshield which is swept by the windshield wiper during its operation.

Hot air as described above would be used in cold weather for ice and snow conditions. However, during warm weather when it is raining only slightly, or when the roadway is wet and the windshield is being splashed, it will be desirable to spray a limited amount of water continuously on the windshield and/or other windows for a short period of time. As illustrated in FIG. 22, an extension 20, 22 may be coupled to main conduit 11 at 21 or at joint 21'.

A reservoir chamber 24 is provided which is filled with a liquid, such as, water, alcohol, or some other low temperature freezing liquid for washing and cleaning the windshield. This liquid medium may be fed to the wipers by any suitable and conventional means, such as a gravity feed, a pump 26 or fan arrangement, a pressure or vacuum system connected to the engine manifold, etc.

Pump 26, etc. would be operated from the dashboard as is the fan in tank 23. Here also, and preferably connected to pump 26, would be means to open pivoted valve 27 so that when pump 26 was operating, valve 27 would be open. However, it is preferred that the valve will normally be closed by a spring 28 until the pump pressure forces it open. Obviously, if desired, a mixture of hot air, and a cold or a heated liquid could be supplied to the wipers. In this case the air will act to produce a "venturi effect" and suck or pull the liquid along the tube to the wipers.

If a pump or other positive pressure means is not used, the fan 23 may supply hot air in the winter. Alternatively, in the summer time, the fan may force cold air through the duct and at the same time such liquid from tank 25 so that an effective mixture of air and atomized water will be played upon the windshield. Obviously, in this type arrangement valve 27 preferably would be opened and closed, to various degrees, from the dashboard, and the liquid in the reservoir conserved, and used only to the extent demanded by the conditions existing on the road and consequently on the windshield.

The embodiments of the invention in which an exclusive property or privilege is claimed are defined as follows:

1. A combined windshield wiper and washer comprising a wiper blade, air supply means, liquid supply means, an air and water collector casing having a series of spaced stops positioned throughout its length, corrugated spring means secured to said spaced stops to form a U and extending toward the outer edge of said air collector casing, said wiper blade being positioned in the bight of said U and removably retained therein by said corrugated spring means, and a tube extending from air supply means to said collector casing, said tube also extending from a liquid supply means to said collector casing whereby the air or liquid may circulate on both sides of said wiper blade throughout substantially its entire length.

2. A combined windshield wiper and washer comprising a wiper blade, air and liquid supply means, a fluid collector casing having a series of spaced stops positioned throughout its length, corrugated spring means secured to said spaced stops to form a U and extending toward the outer edge of said fluid collector casing, said wiper blade being positioned in the bight of said U and removably retained therein by said corrugated spring means, and a fluid tube extending from air chamber means and liquid supply means to said fluid collector casing whereby the various fluids may circulate on both sides of said wiper blade throughout substantially its entire length.

3. A windshield wiper and washer as set forth in claim 2 which also is a defroster comprising a heater element, a movable valve located between and connecting the air and liquid supply means, wherein either heated air, a liquid, or a combination of both may be supplied to the wiper through the fluid collector.

References Cited

UNITED STATES PATENTS

| | | | |
|---|---|---|---|
| 1,396,630 | 11/1921 | Higbee | 15—176 |
| 1,755,059 | 4/1930 | Gallagher | 15—250.04 |
| 1,833,307 | 11/1931 | Riggs | 15—250.07 |
| 3,321,792 | 5/1967 | Senkewich | 15—250.04 |
| 3,371,368 | 3/1968 | Walker | 15—250.04 |

FOREIGN PATENTS 557,668  11/1943  Great Britain.

PETER FELDMAN, *Primary Examiner.*

U.S. Cl. X.R.

15—250.07